Figure 1:
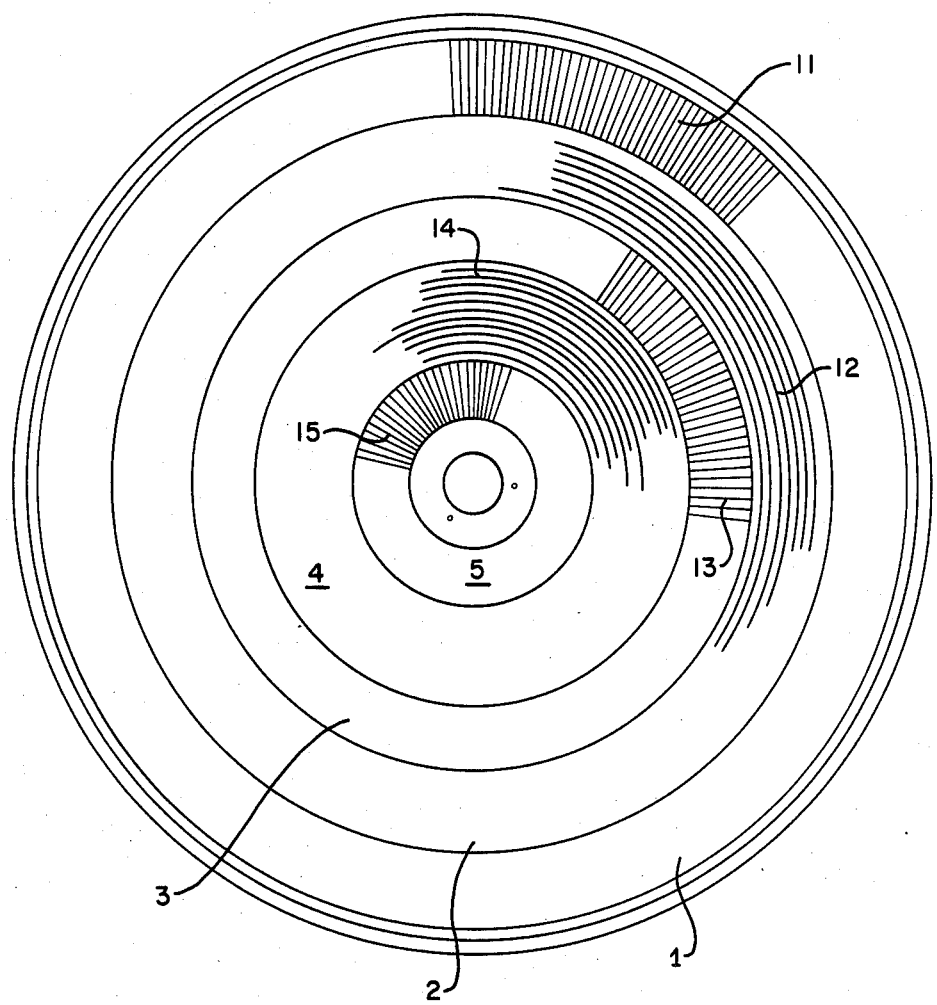

United States Patent [19]
Pettigrew et al.

[11] Patent Number: 4,703,469
[45] Date of Patent: Oct. 27, 1987

[54] OPTICAL DATA RECORDING USING RADIATION OF DIFFERENT CHARACTERISTICS

[75] Inventors: Robert M. Pettigrew; Keith Gardner, both of Foxton; Robert J. Longman, Cambridge, all of United Kingdom

[73] Assignee: Plasmon Data Systems, P.V., Curacao, Netherlands Antilles

[21] Appl. No.: 681,992

[22] PCT Filed: Apr. 9, 1984

[86] PCT No.: PCT/GB84/00123

§ 371 Date: Feb. 11, 1985

§ 102(e) Date: Feb. 11, 1985

[87] PCT Pub. No.: WO84/03986

PCT Pub. Date: Oct. 11, 1984

[30] Foreign Application Priority Data

Apr. 7, 1983 [GB] United Kingdom ................. 8309447

[51] Int. Cl.⁴ ........................... G11B 7/00; G11B 3/70
[52] U.S. Cl. .................................... 369/101; 369/108; 369/110; 369/275; 365/124
[58] Field of Search ............... 369/101, 108, 110, 275, 369/100; 358/332, 333; 365/124

[56] References Cited

U.S. PATENT DOCUMENTS

| | | |
|---|---|---|
| 2,764,629 | 9/1956 | Goldmark .......................... 358/332 |
| 3,167,747 | 1/1965 | Hughes et al. . |
| 3,348,217 | 10/1967 | Snaper . |
| 3,379,095 | 4/1968 | Karpelian ....................... 369/101 X |
| 3,407,272 | 10/1968 | Baioala ........................... 369/108 X |
| 3,688,025 | 8/1972 | Whittemore . |
| 3,753,249 | 8/1973 | Silverman . |
| 4,011,435 | 3/1977 | Phelps et al. . |
| 4,084,185 | 4/1978 | deLang et al. . |
| 4,175,270 | 11/1979 | Zenzefelis ....................... 358/333 X |
| 4,245,229 | 1/1981 | Stephens . |

FOREIGN PATENT DOCUMENTS

| | | |
|---|---|---|
| 0025253 | 3/1981 | European Pat. Off. . |
| 0026517 | 4/1981 | European Pat. Off. . |
| 0107379 | 5/1984 | European Pat. Off. . |
| 1171716 | 11/1969 | United Kingdom . |
| 2058434 | 4/1981 | United Kingdom . |
| 2084786 | 4/1982 | United Kingdom . |
| 2105094 | 3/1983 | United Kingdom . |

*Primary Examiner*—Aristotelis M. Psitos
*Attorney, Agent, or Firm*—Poms, Smith, Lande & Rose

[57] ABSTRACT

Optical data storage members in which the guard bands present between data-carrying tracks of conventional data storage members are used to carry information recorded in a manner which avoids the danger of crosstalk between adjacent tracks. One preferred arrangement consists of an optical data storage member comprising an optically recordable surface having a plurality of tracks in which information may be recorded in analogue or digital form, the tracks being of a first type in which the material constituting the track is sensitive to radiation of a first predetermined characteristic and a second type in which the material thereof is sensitive to radiation of a second predetermined characteristic, wherein tracks of the first type alternate across the surface of the second type. The tracks may be constituted by a surface region (1,2,3,4,5) carrying a plurality of closely spaced grooves (11,12,13,14,15), the grooves of one track being orthogonally directed with respect to those of its adjacent tracks. The predetermined radiation characteristic can be the polarization state of the incident radiation.

5 Claims, 1 Drawing Figure

OPTICAL DATA RECORDING USING RADIATION OF DIFFERENT CHARACTERISTICS

This invention relates to optical data storage and, more particularly, is concerned with (i) a method of recording data on an optical storage member, e.g. a disk; (ii) an optical storage member suitable for such recording; and (iii) an optical storage member carrying recorded information.

There are now a variety of optical data storage systems described in the literature and a limited number of these have been reduced to commercial practice. The term "optical" is used herein to denote radiation whose wavelength lies within the near ultra-violet, the visible range and in the near infra-red range. The optical storage members used are generally disks, and the term "disk" will be used hereinafter to denote an optical storage member regardless of its shape. Currently in all optical disks, information is recorded in tracks with unrecorded bands, known as "guard bands", between them. These guard bands are necessary to prevent cross-talk or interference between adjacent tracks on the optical disk. Typically, a data track of about one micron width will be separated from an adjacent data track by a guard band of about 0.6 micron in width. The dedication of a considerable area of the disk surface to such guard bands means that the information packing density is reduced to a significant extent.

We have now devised a technique whereby the function of a guard band in preventing cross-talk between adjacent tracks of information can be maintained while allowing the recording of information or control data in the guard band zones.

According to the present invention, there is provided an optical data storage member carrying optically-readable information in one or more tracks on the surface of the optical data storge member, wherein adjacent tracks are separated by a guard band carrying information or control data which is recorded so as to be optically distinguishable from the information carried in said track or tracks. In such an optical storage member, there is no need for empty guard bands; accordingly adjacent tracks can be of the same or closely similar width. Despite this equivalence, it will be convenient hereinafter to continue to refer to track as either main data tracks or guard bands.

There are several ways in which information or control data can be recorded in the guard bands of an optical storage member (e.g. a disk) while maintaining that information or control data in a state which is optically distinguishable from the information carried in the main data tracks. Two important ways of achieving this result rely upon differences in wavelength sensitivity or sensitivity to polarisation state between the material constituting the guard bands and that constituting the main data tracks.

According to a second aspect of the present invention, there is provided an optical data storage member comprising an optically-recordable surface having a track or tracks thereon which is or are sensitive to radiation of a first predetermined characteristic and, between said tracks, a second zone or zones of optically-recordable material which is sensitive to radiation of a second predetermined characteristic.

According to a third aspect of the invention, there is provided a method of recording information on an optical storage member, which comprises irradiating a first, pre-selected area of the member with radiation of a first, predetermined characteristic the intensity of which radiation is modulated in analogue or digital form to represent a first set of information; and recording a second area of the member which is contiguous with said first area with radiation of a second, predetermined characteristic the intensity of which radiation is modulated in analogue or digital form to represent a second set of information.

Advantageously, the first and second optical characteristics are either the wavelength of the radiation or its polarisation state.

For effective use of the present invention, the optical data storage medium should have a surface (prior to recording information thereon) which is strongly absorbant of the radiation which is to be used to write the information and control data onto the surface of the storage member. One such strongly absorbant surface can be prepared by producing a surface which is rough on a microscopic scale and in which the depth of the texture is large compared with its pitch. Our European Patent Application No. 83305781.3 (publication No. 0107379 as of May 2, 1984) describes a data storage medium of such a type. More particularly, that application describes and claims a data storage medium having a surface or surface region which is strongly absorbant of at least a predetermined band of wavelengths of electromagnetic radiation, whereby the surface can be written upon by such radiation, the surface or surface region including a layer of heat sensitive material which has a textured surface pattern the pitch of which is smaller than the shortest wavelength within said predetermined band of wavelengths, and the depth (peak-to-trough) of which pattern is at least 100 nm, the textured surface pattern being free from under-cutting so as to be suitable for production or replication by plastics moulding, casting, embossing or similar process against a tool, and the textured surface pattern being overcoated with a thin film of a material which has a high opacity at the predetermined band of wavelengths. The detectable change in the heat sensitive material can be caused by local blistering or ablation of the material, for example by degradation of a polymer to monomeric species, or by melting the plastic or any other method of permanently altering the physical state of the material. One embodiment of such a data storage medium has a surface which is formed with protuberances arranged to form between them a set of generally intersecting grooves. Other embodiments have a surface which is formed with a set of parallel grooves or with two sets of such grooves which intersect one another, as in a crossed grating. Such intersecting grooves may intersect orthogonally. In data storage media of these types, the surface structure can be arranged so that different areas of the disk have different wavelength-dependent absorption characteristics—e.g. one area will absorb strongly at $\lambda_1$ but not at all at $\lambda_2$, whereas a second area will absorb stongly at $\lambda_2$ but not at all at $\lambda_1$. In other words, different areas of the storage member are tund to operate at different wavelengths. This wavelength dependency is more effective with a surface structure having intersecting grooves or protuberances arranged to define between them such grooves.

Our European Patent Application No. 83307419.8 also discloses data storage media of interest. These comprise a substrate having a surface structure comprising grooves having a depth in the range of 20 to 100 nanometers; at or close to this surface structure there is a layer of radiation-responsive material, said material and the surface structure being such that irradiation of selected parts of said surface structure with radiation of a predetermined wavelength causes radiation to be absorbed at the irradiated parts of the surface so that corresponding areas of the radiation-responsive layer are affected so as to render such areas distinguishable from the remaining areas of the radiation-responsive layer.

Examples of suitable optical data storage members use a layer which is sensitive to eletromagnetic radiation and is composed of a binder with a dye which absorbs at specific wavelengths. By using one dye for the main data tracks and a second dye in the guard bands, optical differentiation between the two can effectively be achieved.

Further examples of optical storage members employ a layer which, when exposed to the electromagnetic radiation of suitable wavelength and/or intensity, undergoes a phase change which renders the exposed material distinguishable optically from the unexposed material. By using one phase change material for the main data tracks and a second phase-change material (of different optical characteristics) in the guard bands, optical differentiation between the two can effectively be achieved. Chalcogenides, which undergo amorphous/crystalline phase change when radiation is absorbed, provide examples of materials which may be used in such an embodiment.

Yet further examples of optical data storage media utilise a Fabry-Perot interferometer as part of the recording structure. This interferometer is wavelength-selective by a thickness criterion. Hence by arranging the main data tracks and the guard bands to be Fabry-Perot interferometers of different spacings it is possible to achieve the optical differentiation required by the present invention.

In the examples given above, the recording of control data and/or information will generally require two different wavelengths. This can be achieved by using two sources of radiation with different wavelengths, or alternatively a single laser may be used as the primary source and part of the output of the laser may be Raman-shifted to produce the second radiation source of a different wavelength. Other non-linear mixing techniques may also be utilised for this purpose.

Where the optical parameter which is used to distinguish the main data tracks from the guard bands is the polarisation state of the radiation, the recording medium of which the surface of the optical storage member is formed is preferably of the type disclosed in our European patent application No. 83305781.3. Recording media of this type show a marked difference in sensitivity for orthogonal linear polarisation of the incident radiation. Thus by recording the main data tracks and the guard bands in orthogonal directions (i.e. so that the plane of polarisation in the one differs by 90° from that in the other), the desired result of optical differentiation between the main data tracks and the guard bands can be achieved. Thus reading and writing in the main data tracks and the guard bands is achieved by rotating the polarisation state of the imaging detector or the radiation source, respectively. In one arrangement, the set of grooves in the guard band is arranged orthogonally with respect to those in the main data tracks; for example, the two orientations may be radial and tangential, or they may be truly orthogonal ("x−y"). In the first case the recording/reading apparatus would have static polarisers and analysers in the optical head, while in the second case the polarisers and analysers would be spun in synchronisation with the disk rotation.

In another aspect, the invention provides an optical data storage member as defined hereinabove which member has been exposed to radiation modulated in analogue or digital form to generate an optically-readable, information-carrying member.

Read-out of data storage members in accordance with the present invention may be achieved by known methods appropriate to the nature of the data storage members and the mode of recording used. Suitable techniques are described, inter alia, in our European Patent Applications Nos. 83305781.3; 83307419.8 and 83307424.8.

The invention will be described further by reference to the accompanying drawing, which shows part of an optical data storage member having a number of zones 1, 2, 3, 4 and 5 each of which constitutes a data-carrying zone. Zones 1, 3 and 5 consist of closely spaced radial grooves only some of which are shown (for ease of illustration) at 11, 13 and 15. Zones 2 and 4 are constituted by closely spaced concentric grooves only some of which are shown (again for ease of illustration) at 12 and 14. In the drawing, only five data zones are shown; in practice, an optical data storage member of the type illustrated would contain a very large number, typically several thousands of concentric data zones, alternating between zones having radial grooves such as zones 1 and 3, and those having concentric grooves such as zones 2 and 4.

Each of the grooves, whether one of the radial grooves such as those shown at 11 or one of the concentric grooves such as those shown at 12, is generated by a surface of approximate sinusoidal cross-section in which the depth (peak-to-trough) is 150 nanometers (m), and whose pitch or spacing (mean pitch in the case of the radial grooves 11, 13 and 15) is of the same order as their depth: in any event, their pitch will be less than one half of the wavelength of radiation used to write and read the data storage member. The surface structure represented by the various grooves is formed in a dielectric substrate of polymethylmethacrylate. The textured polymethylmethacrylate surface is coated with a layer of aluminium which is 20 nanometers in thickness; this layer has a high opacity to wavelengths within the range 550 to 900 nm. Instead of aluminium, there may be used silver, gold, chromium or copper. Alternatives to polymethylmethacrylate as the dielectric substrate material include polycarbonates, photoresists, high-temperature nylons and polyesters. These materials can simply replicate an existing grating surface profile, by such well known means as embossing and casting. It is possible by these means to replicate a "master" grating surface many times. The dielectric grating profile does not, therefore, have to be constructed for each optical data storage member. The originally required master grating may, for example, take the form of a nickel-electroplating of a grating formed by photolithography, electron beam lithography, mechanical cutting or other means.

In order to write information onto one of the data zones of a data storage medium as shown in the drawing, polarised radiation of appropriate wavelength, e.g. polarised light at 633 nm, is used. The direction of polarisation is, in every case, perpendicular to the grooves. Hence the plane of polarisation used to write information on grooves 11 is orthogonal with respect to that used to write information on grooves 12. Radiation of relatively high intensity is used to effect a writing operation; once information has been stored, it can be read out by means of lower intensity radiation of the same wavelength and the same polarisation state as that used for the writing operation. It is found that radiation with a polarisation perpendicular to the grooves is strongly absorbed whereas radiation with a polarisation state parallel to the grooves is only weakly absorbed. It is therefore possible to ensure that adjacent data zones such as 11 and 12 do not interfere with one another either during writing or reading. In consequence, data zone 12 is equivalent to an empty guard band which would normally need to be provided between data zones 11 and 13 if these were formed as a conventional optical data storage member. It will thus be appreciated that the information carrying capacity of an optical data storage member in accordance with the present invention is considerably greater than that of its conventional predecessors.

We claim:

1. An optical data storage member, prior to recording information thereon, comprising an optically-recordable surface having a plurality of tracks in which information may be recorded in analogue or digital form, the tracks being of a first type in which the material constituting the track is heat sensitive, and is sensitive to radiation of a first predetermined characteristic but not to radiation of a second predetermined characteristic, and a second type in which the material thereof is also heat sensitive but is sensitive to radiation of said second predetermined characteristic, but not to radiation of said first predetermined characteristc, said material constituting each of said tracks constituting means for changing state in response to heating to alter reading characteristics when irradiated by one of said predetermined types of radiation but not when irradiated by the other of said predetermined type of radiation; wherein tracks of the first type alternate across the surface of the optical data storage member with tracks of the second type, whereby the information may be recorded by irradiating the first and second tracks with radiation respectively of the first and second characteristics so that spaces between adjacent tracks are not required to prevent cross-talk;

said member being of circular form and wherein the tracks are disposed concentrically about the centre of the circular form which constitutes a disk;

said tracks of said first type being constituted by a surface carrying a plurality of closely spaced grooves arranged in a first direction, and wherein the tracks of said second type are constituted by a surface carrying a plurality of closely spaced grooves arranged in a second direction, said first and second directions being mutually substantially orthogonal;

said tracks of said first type carrying radial grooves, and said tracks of said second type carrying concentric grooves; and said adjacent tracks being optically distinguishable from one another by virtue of their response to polarized radiation constituting said predetermined types of radiation.

2. An optical data storage member as defined in claim 1 wherein said material constituting each of said tracks is heat sensitive and includes means for undergoing a physical change of state in response to heating when radiation of one of said two types of radiation is applied, but not when the other type of radiation is applied.

3. An optical data storage member as defined in claim 1 wherein said member is opaque to said radiation of at least one of said characteristics.

4. A member as claimed in claim 1, wherein adjacent tracks are optically distinguishable from one another by virtue of their response to radiation of different wavelengths.

5. A member as claimed in claim 1, which comprises a radiation-sensitive substrate one surface of which carries a textured surface pattern capable of absorbing incident radiation.

* * * * *